United States Patent

[11] 3,591,302

| [72] | Inventor | Donald C. Andreasson |
| --- | --- | --- |
| | | Troy, Mich. |
| [21] | Appl. No. | 823,028 |
| [22] | Filed | May 8, 1969 |
| [45] | Patented | July 6, 1971 |
| [73] | Assignee | Detroit Reamer & Tool Company |
| | | Troy, Mich. |

[54] ROTARY TOOL FOR METAL REMOVAL
3 Claims, 3 Drawing Figs.

[52] U.S. Cl. ............... 408/59, 408/224
[51] Int. Cl. ............... B23d 77/00, B23b 51/06
[50] Field of Search ............... 77/68, 65, 67, 72

[56] References Cited
UNITED STATES PATENTS

| 3,169,417 | 2/1965 | Andreasson | 77/65 |
| 2,786,373 | 3/1957 | Patton | 77/68 X |
| 2,276,532 | 3/1942 | Welty | 77/65 |
| 365,744 | 6/1887 | Heyer | 77/68 X |

Primary Examiner—Francis S. Husar
Attorney—Barnes, Kisselle, Raisch & Choate

ABSTRACT: A rotary, one-piece, multiple-diameter, liquid-cooled tool insert for attachment to a rotary driving shank provided with external and internal coolant passages to provide adequate lubrication and coolant liquid to the various diameters including a remote tip, this being furnished with coolant through an internal passage leading to external land grooves at the tip end to supplement coolant flow also supplied through external flutes.

PATENTED JUL 6 1971
3,591,302
INVENTOR
DONALD C. ANDREASSON
BY
Barnes, Kisselle, Raisch & Choate
ATTORNEYS
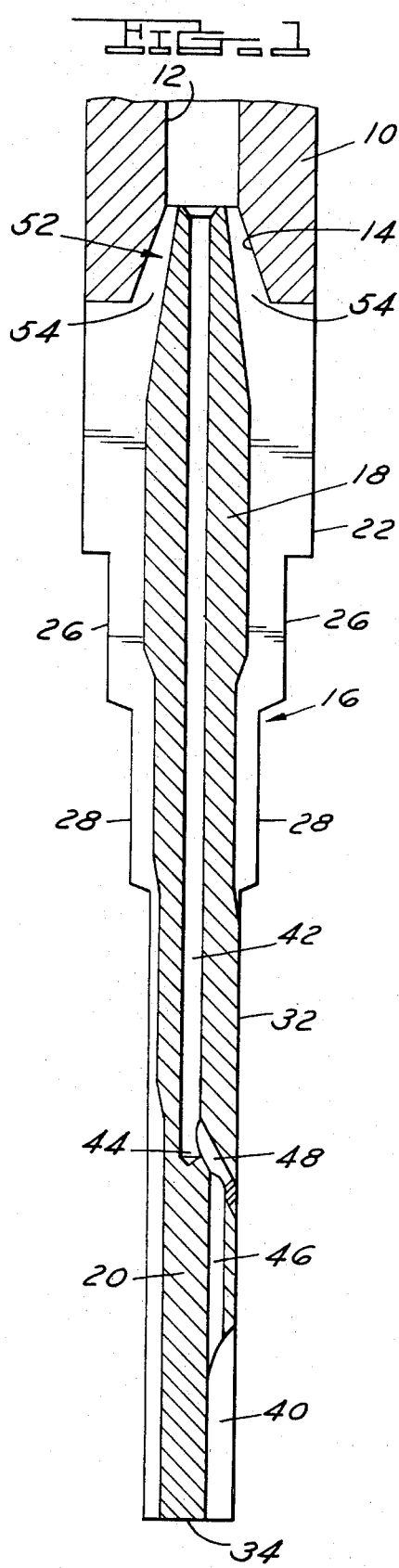
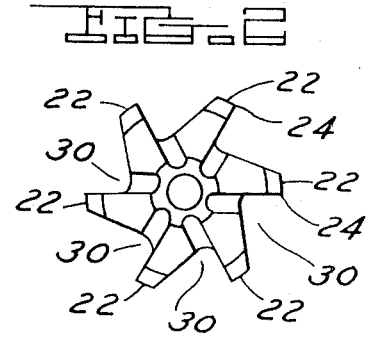
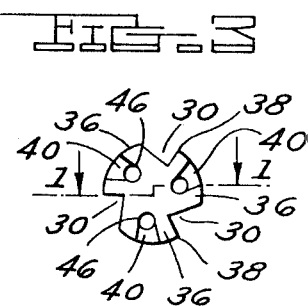

ROTARY TOOL FOR METAL REMOVAL

This invention relates to a Rotary Tool for Metal Removal and more particularly to a rotary tool such as a reamer which has multiple-diameter surfaces to operate in a multiple-diameter hole.

The problem in operating tools of the nature above defined is getting suitable coolant liquid to the varying diameters of the tool, and another problem relates to forming the cutting elements of the tool in a most economical manner.

It has been customary to utilize a relatively tough driving shank such as a steel driving shank and attaching thereto a carbide tip. In making tools with multiple diameters, it has also been the practice to provide a large diameter insert at the shank, and then, where the diameters must be spaced, it has been the practice to insert a smaller steel shank brazed to the first insert and then to attach a smaller insert to the intermediate shank. This has been done in order to get coolant to all of the flutes of the respective diameters.

The present invention contemplates utilizing a solid one-piece insert which is formed with the varying diameters needed and yet which is so created that coolant can reach not only the larger diameters adjacent the driving shank but also the small diameters adjacent the distal end of the insert.

Briefly, this has been accomplished by flowing coolant around the outside of the insert for the larger diameter cutting surfaces and through the inside for the smaller diameter surfaces and providing a suitable passage which can reach the tip of the unit without interfering with the ability to grind the tool throughout its length for resharpening of a number of different stages of use.

Other objects and features of the invention will be apparent in the following description and claims in which the principles of operation are set forth together with the best mode presently contemplated for accomplishing the objects of the invention.

Drawings accompany the disclosure and the various views thereof may be briefly described as:

FIG. 1, a sectional view of a driving shank and cutting insert taken on line 1-1 of FIG. 3.

FIG. 2, a view of the shank end of the insert.

FIG. 3, a view of the tip end of the insert.

Referring to the Drawings:

In FIG. 1 a shank 10 is shown having a central passage 12 and provided with a tapered recess 14 opening from the end of the coolant passage. An insert body designated generally at 16 has a central body portion 18 and a tip body portion 20 at the distal end. Around the body portion 18 are a plurality of cutting lands 22, each having a cutting edge 24 in the case of a reamer.

The lands 22 represent the largest diameter of the insert 16 adjacent the shank 10 with a stepdown diameter at 26, and a further stepdown diameter at 28, these lands each being separated by flutes 30 as shown in FIG. 2. The final diameter of the tool is shown at 32 extending downwardly to the tip of distal end 34. The flutes 30 extend down to the end, but become progressively more shallow as they pass the various diameters, and lie between separating lands 36 which have cutting edges 38.

As shown in FIGS. 1 and 3, the lands 36 at the tip end are provided with surface grooves 40 which extend up from the end 34 a distance approximately equal to the axial length of the lands 26 and 28. The central body portion 18 of the insert 16 has a central bore 42 which terminates at 44 a substantial distance up from the tip end 34. The tip end is drilled axially, upwardly of grooves 40, substantially parallel to the axis with holes 46 spaced outwardly from the center and terminating at an angled passage 48 which connects the passages 46 to the central passage 42. The insert has a truncated conical portion 52 at the shank end which interfits with the conical recess 14 and is brazed in place to provide the proper driving connection and also to permit coolant flow from passage 12.

It will be appreciated that a tool similar to that shown in FIG. 1 in entering a hole very frequently will need the coolant first at the tip end and when the entire coolant is flowing down the outside of the tool, it is not furnished in the degree necessary to properly lubricate and cool the tip end prior to the time that the other diameters enter the hole. A bushing would be difficult to use to retain the coolant because of the larger diameters which follow.

With the present coolant flow the coolant through the passage 12 will flow through the short passages 54 at the conical section 52 to reach the flutes 30 and flow downwardly along the outside of the tool. Some of this may reach the lower flute portions at the tip end, but to insure adequate flow the central passage 42 is provided which will direct a portion of the coolant through the three holes 48 leading to the three passages 46 opening straight down to the surface grooves 40. Thus coolant is directed downward to the tip with no tendency to flare out. Thus, the tip end is adequately lubricated and cooled prior to the time that the other cutting portions 28—26 and 22 enter the hole to be reamed. Making the insert of a single piece avoids the difficulties of inserting a separate shank between the various diameters, thus eliminating alignment problems and reducing the expense by cutting down the necessity of brazing to extra joints which also may weaken the torque transfer in heavy cutting.

It will be noted that the tool is so designed that each diameter cutting area can be ground upwardly to permit quite a number of resharpening grinds. This includes the tip end which because of grooves 40 can be ground at least up to the holes 46. Thus the axial relationship of the various diameters can be maintained when the tool is reground to sharpen. While the invention has been illustrated in connection with a three-flute reamer, it is equally applicable to a single flute or any multiple of lands and flutes.

What I claim as new is as follows:

1. A rotary tool for metal removal which comprises:

a. a rotary driving shank having a central coolant passage and a driving end shaped to receive a cutting insert, and b. a cutting tip comprising a generally cylindrical body formed of hard cutting material having a shank end shaped to interfit with said driving end of the shank and secured thereto, and having a distal end, said body being provided with a plurality of cutting lands spaced by flutes around the outer periphery, the diameter of said lands varying in steps longitudinally from the largest at the shank end approximating the diameter of said shank to the smallest at the distal end, said driving end having openings connecting said coolant passage and said flutes, and having a coolant bore connected to the bore in said shank and extending through said body to a point adjacent lands of a smaller diameter, and a plurality of coolant holes formed substantially parallel to but spaced outwardly from the center of the body, the ends of said holes away from the distal end being connected to said coolant bore, the ends of said holes adjacent the distal end terminating in a groove in a land extending to the distal end of said tip.

2. A one-piece rotary, multiple-diameter, liquid-cooled tool for attachment to a rotary driving shank for metal removal which comprises an elongate, generally cylindrical, body formed of a hard cutting material having a distal end and a shank end with at least one cutting land, spaced by at least one flute around the outer periphery, the diameter of each said land varying in steps longitudinally from the largest at the shank end to the smallest at the distal end, and having a coolant bore extending from the shank end to a point within the body adjacent a land of a smaller diameter, and a series of coolant holes positioned progressively closer to the center of the tool as the tool becomes progressively smaller formed substantially parallel to but spaced outwardly from the center of the body and extending from the distal end toward the shank end of the body to provide coolant to one end of a land nearest the distal end through an open groove in said land, the end of said hole away from the distal end being connected to said coolant bore.

3. A rotary tool as defined in claim 4 in which the land at the distal end is provided with a groove with a terminal point spaced upwardly from the distal end, and the coolant hole originates at the terminal point of this groove.

PO-1050
(5/69)

UNITED STATES PATENT OFFICE
CERTIFICATE OF CORRECTION

Patent No. 3,591,302      Dated July 6, 1971

Inventor(s) Donald C. Andreasson

It is certified that error appears in the above-identified patent and that said Letters Patent are hereby corrected as shown below:

Column 3, line 3, change "4" to -- 2 --.

Signed and sealed this 21st day of December 1971.

(SEAL)
Attest:

EDWARD M. FLETCHER, JR.      ROBERT GOTTSCHALK
Attesting Officer      Acting Commissioner of Patents